(12) United States Patent
Kazmierzak

(10) Patent No.: US 8,308,247 B2
(45) Date of Patent: Nov. 13, 2012

(54) WHEEL MOUNTING SLEEVE

(75) Inventor: Richard R. Kazmierzak, Columbia, SC (US)

(73) Assignee: Accuride EMI, LLC, Camden, SC (US)

( * ) Notice: Subject to any disclaimer, the term of this patent is extended or adjusted under 35 U.S.C. 154(b) by 267 days.

(21) Appl. No.: 12/832,362

(22) Filed: Jul. 8, 2010

(65) Prior Publication Data

US 2012/0007416 A1    Jan. 12, 2012

(51) Int. Cl.
*B60B 3/16* (2006.01)

(52) U.S. Cl. .................................. 301/35.632

(58) Field of Classification Search ............ 301/35.621, 301/35.623, 35.626, 35.632; 411/108; 403/280, 403/282
See application file for complete search history.

(56) References Cited

U.S. PATENT DOCUMENTS

| | | | |
|---|---|---|---|
| 1,607,274 A * | 11/1926 | Hecht ........................... 411/432 |
| 1,889,837 A * | 12/1932 | Michelin .................. 301/35.632 |
| 2,279,954 A * | 4/1942 | Sipe .............................. 403/274 |
| 2,352,487 A * | 6/1944 | Mcnamara, Jr. ............... 301/9.1 |
| 4,310,273 A | 1/1982 | Kirrish |
| 4,679,860 A | 7/1987 | Koishi et al. |
| 4,708,397 A | 11/1987 | Weinmann |
| 4,898,429 A | 2/1990 | Plumer |
| 5,026,122 A | 6/1991 | Grubisic et al. |
| 5,056,870 A | 10/1991 | Plumer |
| 5,094,579 A | 3/1992 | Johnson |
| 5,401,079 A | 3/1995 | Rooney |
| 5,452,944 A | 9/1995 | Bear |
| 5,454,628 A | 10/1995 | Maiworm et al. |
| 5,542,753 A | 8/1996 | Plumer |
| 5,711,581 A * | 1/1998 | Plumer .................... 301/35.632 |
| 6,068,344 A | 5/2000 | Nether |
| 6,092,968 A | 7/2000 | Lanham et al. |
| 6,106,077 A | 8/2000 | Kluge et al. |
| 6,296,319 B1 * | 10/2001 | Hummel et al. ......... 301/35.621 |
| 6,357,981 B1 | 3/2002 | Lanham et al. |
| 6,439,816 B1 | 8/2002 | Nance et al. |
| 6,478,521 B1 | 11/2002 | Tschunko et al. |
| 6,715,843 B2 | 4/2004 | Teague |
| 7,111,909 B2 * | 9/2006 | Andersen ................. 301/35.627 |
| 7,252,471 B1 | 8/2007 | Manyoky et al. |
| 7,290,838 B2 | 11/2007 | Handa et al. |
| 2004/0165967 A1 | 8/2004 | Winker |
| 2005/0163589 A1 | 7/2005 | Wilson |
| 2006/0163937 A1 | 7/2006 | Andersen |
| 2007/0007816 A1 | 1/2007 | Willmer |
| 2009/0218878 A1 | 9/2009 | Lippis |

FOREIGN PATENT DOCUMENTS

JP          62163801 A   *   7/1987

* cited by examiner

*Primary Examiner* — Kip T Kotter
(74) *Attorney, Agent, or Firm* — Harness, Dickey & Pierce, P.L.C.

(57) ABSTRACT

A sleeve for a fastener aperture in a vehicle wheel includes a tubular body having a first end and a plurality of external conically shaped barbs. The barbs include successively increasing outer diameters as a distance from the first end increases. A head radially outwardly extends from a second end of the body and is adapted to engage a land on the wheel that encompasses the fastener aperture. A bore extends through the body and the head and is adapted to receive a wheel fastener.

19 Claims, 3 Drawing Sheets

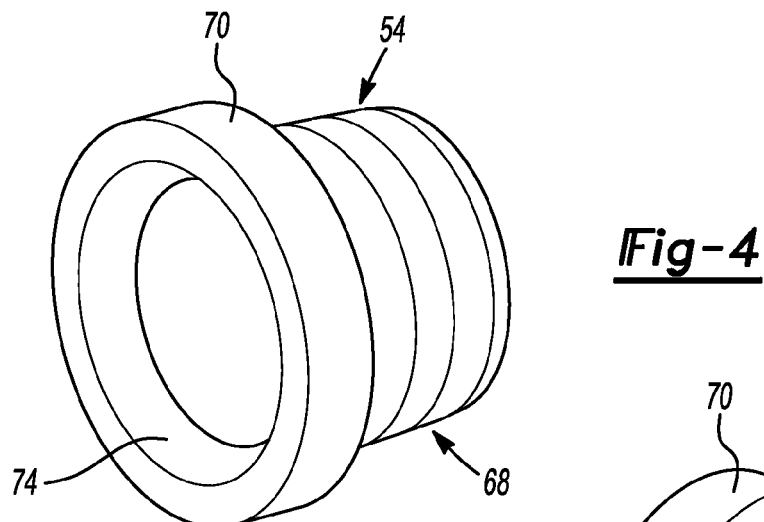
*Fig-4*
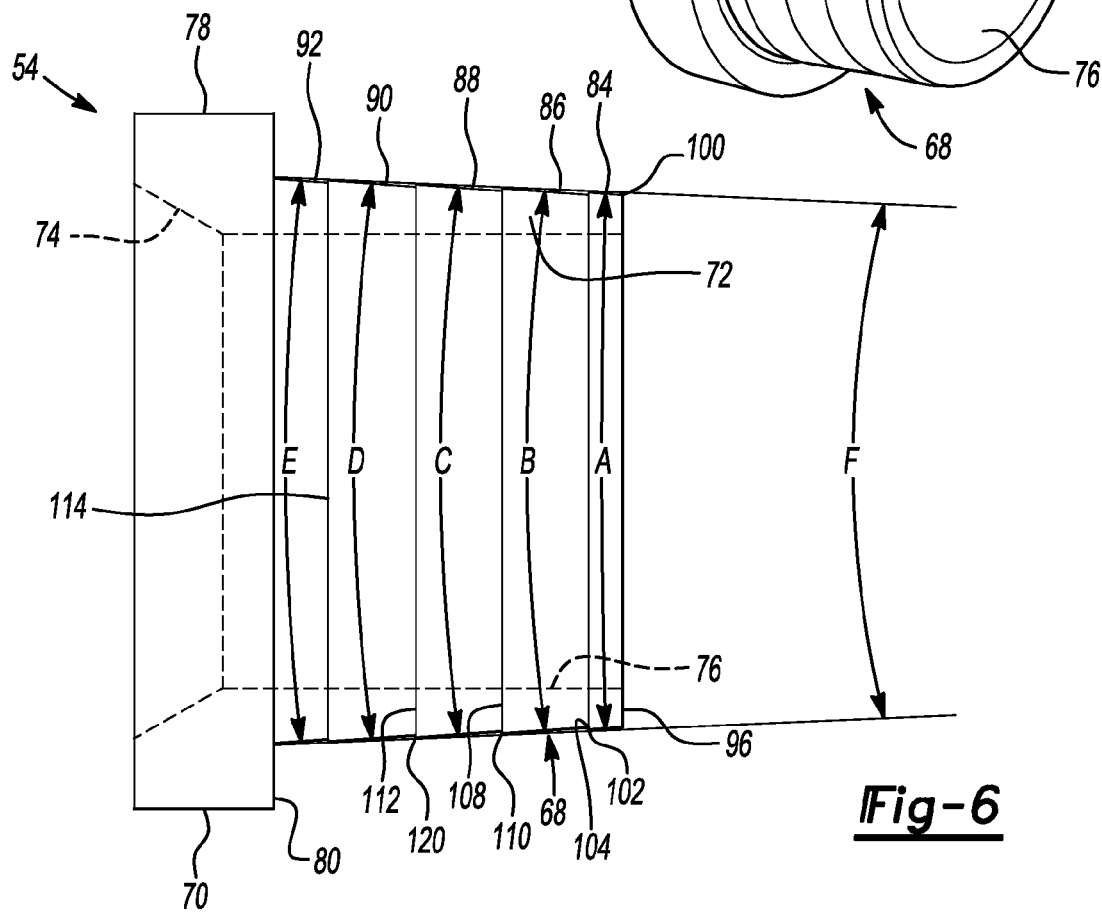
*Fig-5*
*Fig-6*

WHEEL MOUNTING SLEEVE

FIELD

The present disclosure generally relates to mounting arrangements for vehicle wheels. More particularly, a wheel mounting sleeve is provided to cooperate with a non-ferrous wheel and standard lug nut.

BACKGROUND

This section provides background information related to the present disclosure which is not necessarily prior art.

Vehicle manufacturers have provided both ferrous wheels and non-ferrous wheels for motor vehicles for many years. The non-ferrous wheels have typically been constructed from aluminum or magnesium materials. The non-ferrous wheels typically weigh less than the steel wheels and are generally viewed as being more attractive. As such, many vehicle purchasers initially opt for a non-ferrous wheel option. Steel wheels are generally less costly. Accordingly, steel wheels continue to be very popular.

Some sets of wheel attachment hardware include wheel studs and lug nuts that are designed to couple only one of a steel wheel or a non-ferrous wheel to a rotatable hub. Distinct sets of wheel attachment hardware may be provided because the studs and lug nuts used for mounting the steel wheels may not be configured to couple non-ferrous wheels to wheel hubs. A substantial difference in yield strength exists between the different wheel materials and thus drives the need for different fasteners. The steel wheels typically exhibit a yield strength of 75,000-125,000 psi while many aluminum wheels exhibit yield strengths ranging from 45,000-55,000 psi. To accommodate for this difference, nuts used to couple to aluminum wheels to hubs may include radially outwardly extending flanges to apply a clamping load to a greater surface area of the non-ferrous wheel. The lug nuts associated with steel wheel applications typically do not include a flange but include a ball shaped seat.

While the provision of dedicated wheel attachment hardware may be acceptable within a vehicle manufacturing plant, difficulties may arise when a user desires to retro-fit the vehicle with a non-ferrous wheel when originally equipped with a steel wheel. In particular, it may be desirable to replace the wheel without also replacing associated components such as tires, wheel studs, lug nuts and/or suspension members. Therefore, a need in the art exists for an improved wheel mounting arrangement.

SUMMARY

This section provides a general summary of the disclosure, and is not a comprehensive disclosure of its full scope or all of its features.

A sleeve for a fastener aperture in a vehicle wheel includes a tubular body having a first end and a plurality of external conically shaped barbs. The barbs include successively increasing outer diameters as a distance from the first end increases. A head radially outwardly extends from a second end of the body and is adapted to engage a land on the wheel that encompasses the fastener aperture. A bore extends through the body and the head and is adapted to receive a wheel fastener.

A wheel and sleeve assembly includes a metal vehicle wheel including a mounting flange having a plurality of apertures adapted to receive wheel mounting fasteners. Each aperture includes a conically shaped wall. A sleeve is positioned within each fastener aperture with an interference fit. Each sleeve includes a tubular body having a plurality of barbs where each barb has a different maximum diameter such that the maximum diameters of the barbs define a tapered profile of the body substantially matching a profile of the conically shaped wall. A flange radially outwardly extends from an end of the body and is adapted to engage a portion of the wheel that encompasses the fastener aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a perspective view of a sleeve;

FIG. 5 is another perspective view of the sleeve; and

FIG. 6 is a cross-sectional side view of the sleeve.

Corresponding reference numerals indicate corresponding parts throughout the several views of the drawings.

DETAILED DESCRIPTION

Example embodiments will now be described more fully with reference to the accompanying drawings.

Figure 1:
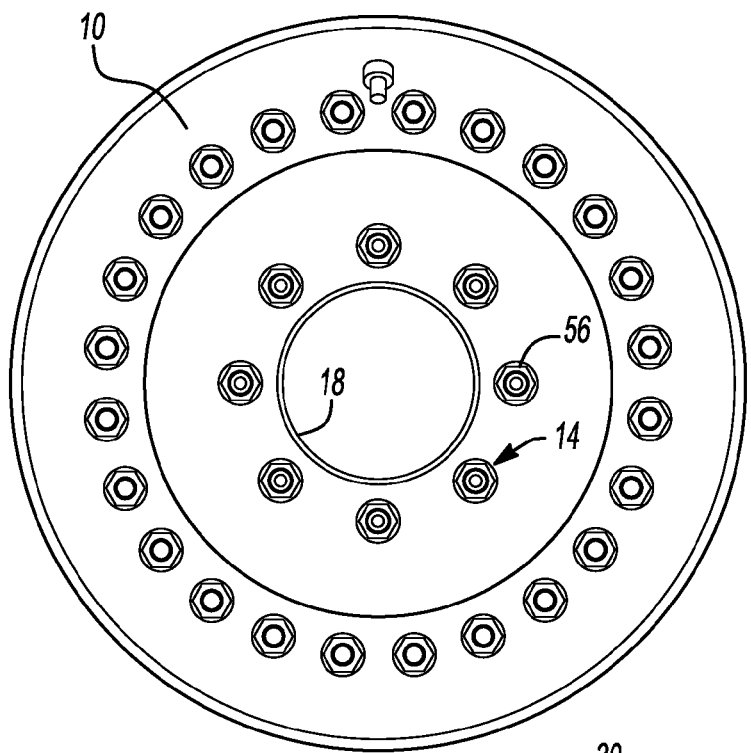
FIG. 1 is a plan view of a wheel assembly including a sleeve constructed in accordance with the teachings of the present disclosure.
Figure 2:
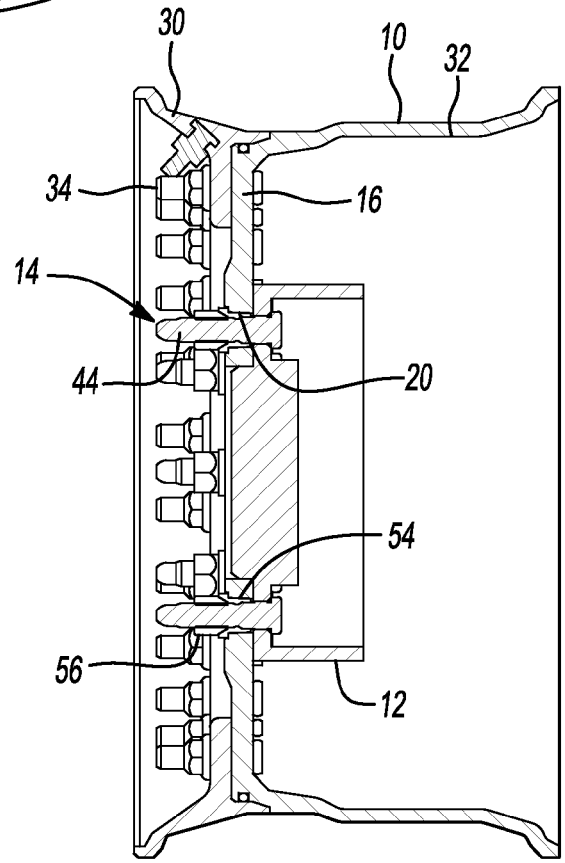
FIG. 2 is a cross-sectional side view of the wheel assembly depicted in FIG. 1.
Figure 3:
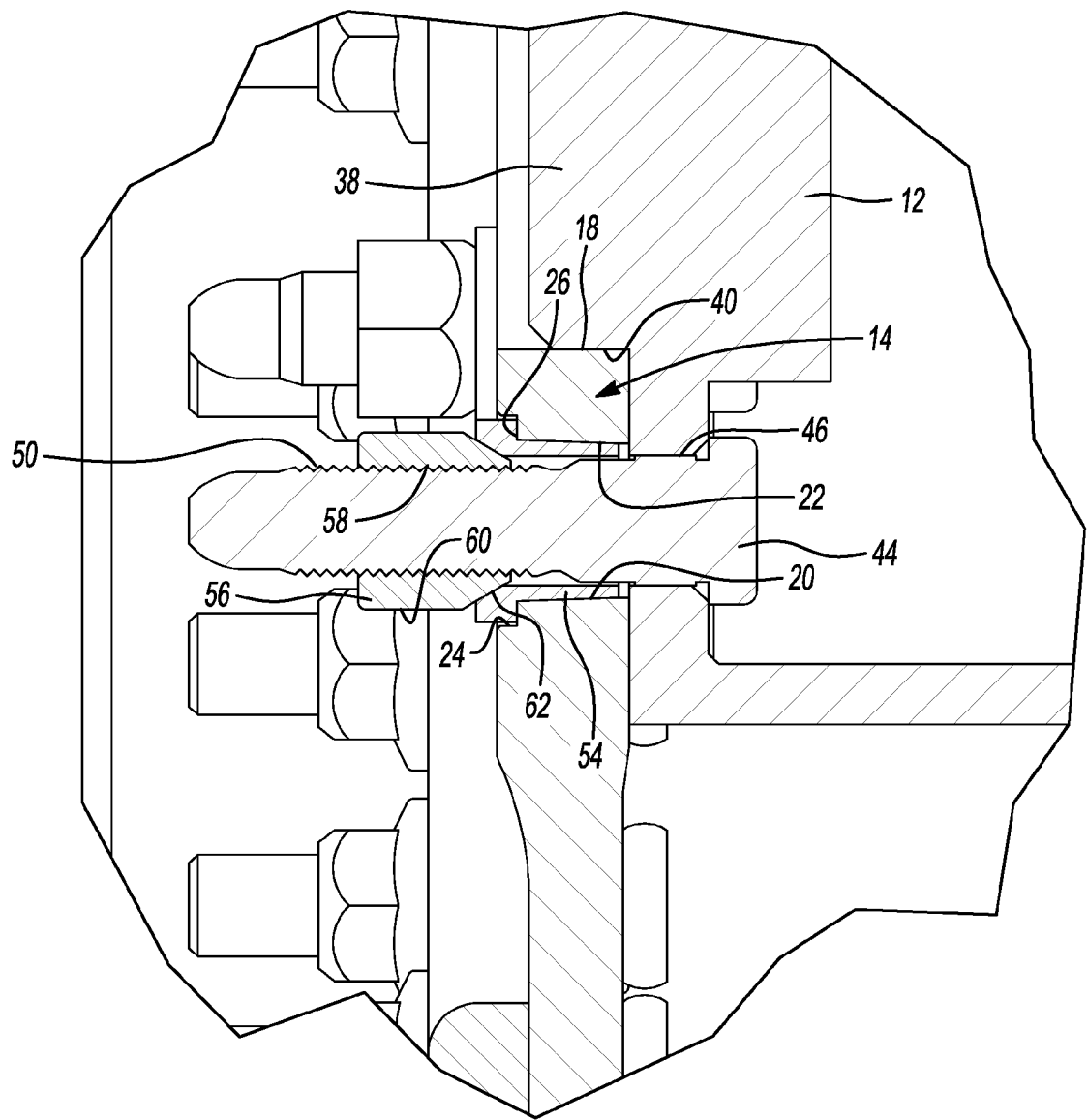
FIG. 3 is an enlarged fragmentary cross-sectional view of the wheel assembly.

FIGS. 1-3 depict an exemplary non-ferrous, aluminum wheel 10 fixed for rotation with a rotatable hub 12 by a fastener assembly 14. Wheel 10 includes a mounting flange 16 including a central aperture 18 and a plurality of wheel stud apertures 20 circumferentially spaced apart from one another. Each aperture 20 is shaped as a counterbore including a tapered or conical portion defined by a wall 22 and a cylindrical portion defined by a wall 24. A land 26 extends radially outwardly from wall 22 to wall 24.

Wheel 10 is shown as a two-piece wheel including an outer ring 30 fixed to an inner ring 32 with a plurality of threaded fasteners 34. This wheel construction is merely exemplary. It should be appreciated that the wheel mounting arrangement of the present disclosure may be used in conjunction with any number of singular or multi-piece wheels.

Hub 12 includes an axially protruding pilot 38 with a cylindrical surface 40 having an outer diameter slightly less than an inner diameter of aperture 18. A plurality of wheel studs 44 are fixed to hub 12 via a splined or knurled interference coupling 46. Each wheel stud 44 extends through a corresponding wheel stud aperture 20 and includes an externally threaded portion 50.

Wheel fastener assembly 14 includes a sleeve 54 and a lug nut 56. Lug nut 56 may be constructed from steel and include an internal thread 58 in engagement with external thread 50 of wheel stud 44. Lug nut 56 also includes a plurality of flats 60 for engagement with a driving tool such as a socket. A substantially spherical surface 62 is formed on the end of lug nut 56 that engages sleeve 54. Surface 62 may partially deform during engagement with sleeve 54.

FIGS. 4-6 depict sleeve 54 in greater detail. Sleeve 54 is formed from a heat treated steel such as SAE 4140. Sleeve 54 includes a tapered and barbed body portion 68 as well as a flanged head 70. A bore 72 extends through sleeve 54 and includes a conically shaped seat portion 74 as well as a cylindrically shaped portion 76. Flanged head 70 includes an outer substantially cylindrical surface 78 that remains clear of wall 24. A substantially planar surface 80 of flanged head 70 engages land 26 of wheel 10 once sleeve 54 has been coupled to wheel 10.

An external profile of body portion 68 includes first through fifth frusto-conical surfaces 84, 86, 88, 90, 92 positioned adjacent to one another. First conical surface 84 intersects an end face 96 of sleeve 54. First conical surface 84 includes a minimum diameter at a circle 100 intersecting end face 96 and extends radially outwardly at an included angle A of approximately 17° to a first back face 102.

Second conical surface 86 includes a minimum diameter at a circle 104 intersecting back face 102. The diameter of second conical surface 86 at circle 104 is less than the maximum diameter of first conical surface 84. As such, a stepped and barbed geometry is defined. Second conical face 86 extends at an included angle B of approximately 8.3° to a second back face 108. The axial length of second conical surface 86 is more than twice the axial length of first conical surface 84.

Third conical surface 88 includes a minimum diameter circle 110 at the intersection of second back face 108. The minimum diameter of third conical surface 88 is less than the maximum diameter defined by second conical surface 86 such that another barbed and stepped transition exists at second back face 108. Third conical surface 88 also extends at an included angle C of approximately 8.3° to a third back face 112.

Fourth conical surface 90 also extends at a similar included angle D of 8.3° to a fourth back face 114. Fourth conical surface 90 includes a minimum diameter portion at a circle 120 having a diameter less than the maximum diameter portion of third conical surface 88. A similar stepped arrangement exists between fourth conical surface 90 and fifth conical surface 92. Fifth conical surface 92 extends at an included angle E of approximately 5.6°. It is contemplated that the minimum diameter defined by first conical surface 84 at circle 100 is less than the minimum inner diameter of wall 22. Furthermore, at least one of the conical surfaces 84, 86, 88, 90, 92 includes an outer diameter that is greater than the inner diameter of wall 22. Based on the direction of insertion, the tapered conical surfaces, and the fact that sleeve 54 is constructed from a hardened steel, the non-ferrous material of wheel 10 displaces to allow insertion of sleeve 54 within aperture 20.

Sleeves 54 are inserted within apertures 20 and driven to a final seated position through the use of a press and/or lug nuts 56. During initial sleeve to wheel installation, sleeves 54 continue to be axially translated until surface 80 engages land 26. During the axial translation, at least one of conical surfaces 84, 86, 88, 90, 92 engages tapered wall 22 of aperture 20 in an interference fit. In one arrangement, the maximum diameter portion of each barb will biasedly engage wall 22 prior to sleeve 54 being fully inserted. This may be accomplished by positioning the maximum diameter portion of each conical surface 84, 86, 88, 90, 92 axially spaced apart from one another to define a tapered profile of sleeve 54. An included angle F of the tapered profile is substantially similar to the profile of wall 22.

Once sleeve 54 is in the final seated position, portions of wheel 10 remain deformed and retained in the portions of sleeve 54 immediately adjacent one or more of first back face 102, second back face 108, third back face 112 and fourth back face 114. After initial installation, sleeves 54 are permanently coupled to wheel 10 due to the tapered and barbed shape of the outer surfaces previously described. Sleeves 54 will maintain a fixed relationship to wheel 10 regardless of the presence of absence of a clamping load from lug nuts 56.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sleeve for a fastener aperture in a vehicle wheel, the sleeve comprising:
   a tubular body having a first end and a plurality of external conically shaped barbs, the barbs having successively increasing outer diameters as a distance from the first end increases;
   a head radially outwardly extending from a second end of the body and adapted to engage a land on the wheel that encompasses the fastener aperture; and
   a bore extending through the body and the head being adapted to receive a wheel fastener, wherein the barbs include a material having a yield strength greater than a yield strength of the vehicle wheel, the body being shaped to mechanically deform a portion of the wheel and retain the deformed portion between adjacent barbs.

2. The sleeve of claim 1 wherein at least one of the barbs is adapted to engage a side wall of the wheel fastener aperture in an interference fit.

3. The sleeve of claim 1 wherein a portion of the bore within the head includes a conical shape.

4. The sleeve of claim 1 wherein the body includes five conically shaped external surfaces.

5. The sleeve of claim 4 wherein a maximum diameter end of one of the conical surfaces is adjacent to a minimum diameter end of another one of the conical surfaces.

6. The sleeve of claim 5 further including a radially extending back face interconnecting the one and the another one of the conical surfaces.

7. The sleeve of claim 1 wherein the head and the body are portions of a one-piece monolithic sleeve.

8. The sleeve of claim 7, wherein the sleeve includes a heat treated steel.

9. The sleeve of claim 1 wherein the head includes an external cylindrical surface adapted to be spaced apart from the wheel.

10. A wheel and sleeve assembly comprising:
    a metal vehicle wheel including a mounting flange having a plurality of apertures adapted to receive wheel mounting fasteners, wherein each aperture includes a conically shaped wall; and
    a sleeve positioned within each fastener aperture with an interference fit with the conically shaped wall, each sleeve including:
    a tubular body having a plurality of barbs, each barb having a different maximum diameter such that the maximum diameters of the barbs define a tapered profile of the body substantially matching a profile of the conically shaped wall and a flange radially outwardly extending from an end of the body, wherein the flange is adapted to engage a portion of the wheel that encompasses the fastener aperture.

11. The assembly of claim 10 wherein at least one barb includes a conical surface terminating at a substantially radially extending back face.

12. The assembly of claim 10 wherein each of the barbs includes a conical surface.

13. The assembly of claim 12 wherein a maximum diameter end of one of the conical surfaces is adjacent to a minimum diameter end of another one of the conical surfaces.

14. The assembly of claim 13 further including a radially extending back face interconnecting the one and the another one of the conical surfaces.

15. The assembly of claim 10 wherein the sleeve includes a conical inner wall.

16. The assembly of claim 15 wherein the wheel includes a counterbore coaxially aligned with the conically shaped wall, the counterbore having a substantially planar land circumscribed by a cylindrical wall, the flange engaging the land.

17. The assembly of claim 10 wherein the conical wall of the wheel includes a non-ferrous material and the sleeve barbs include a ferrous material.

18. A wheel and sleeve assembly comprising:
a metal vehicle wheel including a mounting flange having a plurality of apertures adapted to receive wheel mounting fasteners, wherein each aperture includes a conically shaped wall; and
a sleeve positioned within each fastener aperture with an interference fit, each sleeve including:
  a tubular body having a plurality of barbs, each barb having a different maximum diameter such that the maximum diameters of the barbs define a tapered profile of the body substantially matching a profile of the conically shaped wall and
  a flange radially outwardly extending from an end of the body, wherein the flange is adapted to engage a portion of the wheel that encompasses the fastener aperture, wherein the wheel includes a counterbore coaxially aligned with the conically shaped wall, the counterbore having a substantially planar land circumscribed by and directly adjoining a cylindrical wall, the flange engaging the land, wherein the flange includes an outer periphery spaced apart from the cylindrical wall.

19. A wheel and sleeve assembly comprising:
a metal vehicle wheel including a mounting flange having a plurality of apertures adapted to receive wheel mounting fasteners, wherein each aperture includes a conically shaped wall; and
a sleeve positioned within each fastener aperture with an interference fit, each sleeve including:
  a tubular body having a plurality of barbs, each barb having a different maximum diameter such that the maximum diameters of the barbs define a tapered profile of the body substantially matching a profile of the conically shaped wall and
  a flange radially outwardly extending from an end of the body, wherein the flange is adapted to engage a portion of the wheel that encompasses the fastener aperture, wherein the conical wall of the wheel includes a non-ferrous material and the sleeve barbs include a ferrous material, wherein the non-ferrous material deforms during insertion of the sleeve within the wheel aperture and becomes trapped by the barbs to restrict movement of the sleeve in a direction opposite the insertion direction.

* * * * *